(12) United States Patent
Aluru et al.

(10) Patent No.: US 12,322,115 B2
(45) Date of Patent: Jun. 3, 2025

(54) CONTROL ALGORITHM TO PRECISELY EVALUATE EDGE QUALITY FROM IMAGERY

(71) Applicant: GM Global Technology Operations LLC, Detroit, MI (US)

(72) Inventors: Sai Vishnu Aluru, Commerce Township, MI (US); Michael Cervoni, Lake Orion, MI (US); Jonathan Patrick Agnew, Clarkston, MI (US); Logan Elliot Stack, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 444 days.

(21) Appl. No.: 17/935,277

(22) Filed: Sep. 26, 2022

(65) Prior Publication Data

US 2024/0104743 A1     Mar. 28, 2024

(51) Int. Cl.
*G06T 7/13*     (2017.01)
*G06T 5/10*     (2006.01)
(Continued)

(52) U.S. Cl.
CPC .............. *G06T 7/13* (2017.01); *G06T 5/10* (2013.01); *G06V 10/60* (2022.01); *G06V 10/761* (2022.01);
(Continued)

(58) Field of Classification Search
CPC ... G06T 7/13; G06T 5/10; G06T 2207/20056; G06T 2207/20132; G06T 2207/30168; G06T 2207/30268; G06T 7/0002; G06V 10/60; G06V 10/761; G06V 10/471; G06V 20/56; G06V 10/44
See application file for complete search history.

(56) References Cited

U.S. PATENT DOCUMENTS 10,067,029 B2 * 9/2018 Cardei ..................... G06T 7/13
2014/0195138 A1 * 7/2014 Stelzig ................. G08G 1/0116
701/119

(Continued)

OTHER PUBLICATIONS

Islam, Md Rashidul, et al. "A convolutional neural network for end to end structural prediction and lane detection for autonomous vehicle." 2021 5th International Conference on Electrical Engineering and Information Communication Technology (ICEEICT). IEEE, 2021. (Year: 2021).*

(Continued)

*Primary Examiner* — Gregory A Morse
*Assistant Examiner* — Renae A Bitor
(74) *Attorney, Agent, or Firm* — Vivacqua Crane, PLLC

(57) ABSTRACT

A method for evaluating edge quality in an image includes receiving an image from a camera of a vehicle, detecting an edge in the image captured by the camera, fitting a polynomial curve to the edge in the image captured by the camera, executing a numerical optimizer to determine a minimum distance from each pixel in the image of the edge to the polynomial curve, determining a modulation transfer function (MTF) value using the minimum distance, determining whether the MTF value is greater than predetermined threshold, and providing an alert in response to determining that the MTF value is not greater than the predetermined threshold.

17 Claims, 1 Drawing Sheet

(51) Int. Cl.
*G06V 10/60* (2022.01)
*G06V 10/74* (2022.01)

(52) U.S. Cl.
CPC ............... *G06T 2207/20056* (2013.01); *G06T 2207/20132* (2013.01); *G06T 2207/30168* (2013.01); *G06T 2207/30268* (2013.01)

(56) References Cited

U.S. PATENT DOCUMENTS

| | | | |
|---|---|---|---|
| 2018/0075588 A1* | 3/2018 | Hosoda | H04N 25/134 |
| 2018/0342082 A1* | 11/2018 | Lewis | H04N 17/002 |
| 2024/0073405 A1* | 2/2024 | Shigematsu | G06T 7/00 |

OTHER PUBLICATIONS

Xu, C., Cao, J., Yong, A., Zhang, Z., & Liu, H. (2022). Study on Sharpness Evaluation Method of Vehicle Imaging System. In Interdisciplinary Research for Printing and Packaging (pp. 113-120). Singapore: Springer Singapore. (Year: 2022).*

* cited by examiner

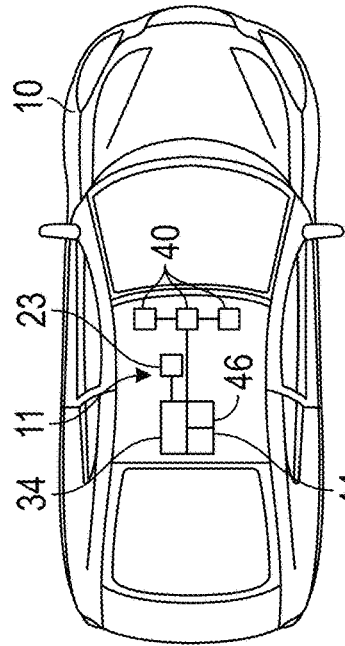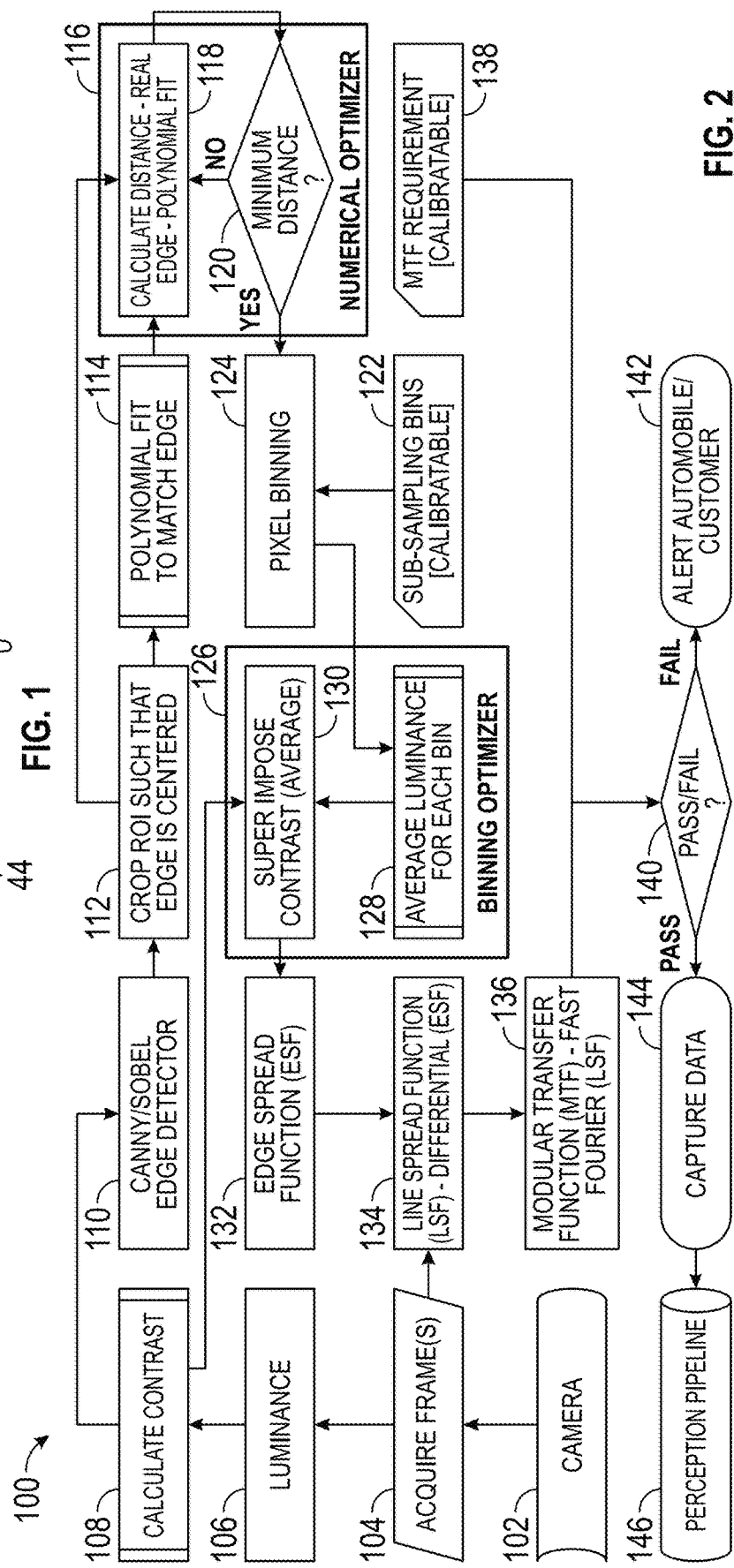
FIG. 1
FIG. 2

CONTROL ALGORITHM TO PRECISELY EVALUATE EDGE QUALITY FROM IMAGERY

INTRODUCTION

The present disclosure relates to images captured by cameras and, more particularly, to systems and methods for precisely evaluating edge quality from imagery.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Wide field of view cameras have a higher amount of fisheye distortion than other cameras. As a consequence, measuring modulation transfer function (MTF) on fisheye images is extremely complex and requires significant computational resources. Some methods of evaluating MTF use a simple algorithm that often sacrifices accuracy, particularly when measuring the accuracy of the curved edges, which are introduced because of the fisheye distortion. It is therefore desirable to develop a method that accurately determines MTF. The presently disclosed method involves a thorough calculation that fits the detected edge closer than other methods. Therefore, presently disclosed method is capable of an accurate MTF calculation on any shaped edges with a greater precision than other methods. Specifically, the presently disclosed method uses a numerical optimizer that allows this method to be generalized for any angle and/or curved edges.

SUMMARY

The present disclosure describes a method for evaluating edge quality in an image. In an aspect of the present disclosure, the method includes receiving an image from a camera of a vehicle, detecting an edge in the image captured by the camera, fitting a polynomial curve to the edge in the image captured by the camera, executing a numerical optimizer to determine a minimum distance om each pixel in the image of the edge to the polynomial curve, determining a modulation transfer function (MTF) value using the minimum distance, determining whether the MTF value is greater than predetermined threshold, and providing an alert in response to determining that the MTF value is not greater than the predetermined threshold. The method described in this paragraph improves imaging technology by more accurately determining the MTF value and therefore determining which images accurately depict an edge.

In an aspect of the present disclosure, the method further includes pixel binning a plurality of pixels of the edge in the image to generate a plurality of super pixels.

In an aspect of the present disclosure, the method further includes determining an average luminance value for each of the plurality of super pixels.

In an aspect of the present disclosure, the method further includes executing an adjusted pixel binning using the average luminance value for each of the plurality of super pixels.

In an aspect of the present disclosure, the image includes image data. The method further includes storing the image data in response to determining that the MTF value is greater than predetermined threshold.

In an aspect of the present disclosure, the method further includes determining an edge spread function of the edge using the plurality of super pixels.

In an aspect of the present disclosure, the method further includes determining a line spread function of the edge using the edge spread function. The line spread function is a first derivative of the edge spread function.

In an aspect of the present disclosure, determining the MTF value using the minimum distance includes determining the MTF value using the line spread function. The MTF is a Fast Fourier transform of the line spread function.

In an aspect of the present disclosure, detecting the edge in the image captured by the camera includes using a Canny edge detector or other appropriate edge detector to detect the edge in the image.

In an aspect of the present disclosure, detecting the edge in the image captured by the camera includes using a Sobel edge detector to detect the edge in the image.

In an aspect of the present disclosure, the method further includes cropping the image such that the edge is centered in the image.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic diagram of a vehicle including a system for evaluating edge quality from imagery; and FIG. 2 is a flowchart of method for evaluating edge quality from imagery.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for evaluating edge quality from imagery. While the system 11 is shown inside the vehicle 10, it is contemplated that the system 11 may be outside of the vehicle 10. As a non-limiting example, the system 11 may be a cloud-based system in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The vehicle 10 may be an autonomous vehicle configured to drive autonomously.

The system 11 includes a controller 34 and one or more cameras 40 in communication with the controller 34. The cameras 40 have a field of view large enough to capture images in front, in the rear, and to the sides of the vehicle 10.

The system 11 further includes a controller 34 in communication with the cameras 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the cameras 40, perform logic, calculations, methods and/or algorithms for automatically controlling the components of the vehicle 10, and generate control signals to the actuators to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones and/or other devices suitable to provide a notification or alert to the vehicle user of the vehicle 10. The user interface 23 is in electronic communication with the controller 34 and is configured to receive inputs by a vehicle user (e.g., a vehicle user or a vehicle passenger). For example, the user interface 23 may include a touch screen and/or buttons configured to receive inputs from a vehicle user. Accordingly, the vehicle controller 34 is configured to receive inputs from the vehicle user via the user interface 23 and to provide an output (i.e., an alert) to the vehicle user.

As discussed in detail below, the system 11 is configured to precisely and objectively evaluate an edge in an image. In the present disclosure, the term "edge" means a region in an image where there is a sharp change intensity or a sharp change in color. In the presently disclosed system 11, the camera evaluation for clarity, sharpness, and edge enhancement is determined by using the contrast at a particular resolution from the object to the imager (i.e., camera), typically by using a slanted edge process that is called Modulation Transfer Function (MTF). Currently, MTF varies depending on many aspects of the camera 40, such as different pixel sizes and the types of object planes that are manufactured with distance from focal imager. Currently, the minimum distance of every pixel is assumed by averaging a set of distances. However, the presently disclosed system 11 and method 100 (FIG. 2) improves accuracy by ensuring that the center of every pixel is aligned to obtain the true minimum distance between the center of a pixel and the projected polynomial curve edge, thereby obtaining a more consistent result among various cameras 40. As a result, the MTF accuracy is improved. The system 11 uses a numerical optimizer to dynamically verify the accuracy of the minimum distance from the projected slant edge on the imager to further possibly correct the correlation between the lens and the imager to a precise value. The presently disclosed method 100 (FIG. 2) may be executed in real time, on different possible scenarios, to verify the accuracy of the camera's radiometric elements (i.e., lens assembly), especially when placed behind glass/windshield.

FIG. 2 is a flowchart of a method 100 for evaluating edge quality from imagery. The method 100 begins at block 102. At block 102, one or more cameras 40 of the vehicle 10 captures an image. The image includes image data, which is indicative of the image. The image (and therefore the image data) is sent from the camera 40 to the controller 34 of the system 11. The controller 34 of the system 11 then receives the image (and therefore the image data) from the camera 40 of the vehicle 10. Then, the method 100 continues to block 104.

At block 104, the controller 34 acquires one or more frames from the image captured by the camera 40. Then, the method 100 continues to block 106.

At block 106, the controller 34 determines (e.g., calculate) the luminance of the image captured by the camera 40 of the vehicle 10. Then, the method 100 proceeds to block 108.

At block 108, the controller 34 determines (e.g., calculates) the contrast of the image captured by the camera 40 of the vehicle 10. Next, the method 100 continues to block 110.

At block 110, the controller 34 detects one or more edges in the image captured by the camera 40 of the vehicle 10. In the present disclosure, the term "edge" means a region in an image where there is a sharp change intensity or a sharp change in color. To detect an edge in the image, the controller 34 may use a Canny edge detector or a Sobel edge detector. After detecting the edge in the image, the method 100 proceeds to block 112.

At block 112, the controller 34 crops the image captured by the camera 40. Specifically, the controller 34 crops a region of interest (ROI) such that the edge previously detected is centered. As a result, the previously detected edge is centered in the cropped image. Then, the method 100 continues to block 114.

At block 114, the controller 34 fits a polynomial curve to match the edge detected at block 110. In other words, the controller 34 uses a polynomial curve fitting process to fit a polynomial curve to match the edge detected at block 110. As a non-limiting example, the controller 34 may use a polynomial curve regression, a least squares method, among others, to fit a polynomial curve or other representative function to match the edge in the image. Then, the method 100 continues to block 116.

At block 116, the controller 34 executes a numerical optimizer 116 to find the minimum distance from each pixel in the image of the edge to the polynomial curve created at block 114. As a non-limiting example, the numerical optimizer may be a minimum-distance estimator using the Chi-square criterion, the Cramér-von Mises criterion, the Kolmogorov-Smirnov criterion, and Anderson-Darling criterion. For example, the numerical optimizer may be a Levenberg-Marquardt algorithm, which is also known as the damped least-squares (DLS) method. The numerical optimizer 116 may include substep 116 and substep 118. At substep 116, the controller 34 determines (e.g., calculates) the distance from each pixel in the image of the edge to the polynomial curve. This calculated distance is $\|\text{Current Pixel Location—Polynomial Fit(Current Pixel Location)}\|_2$. Current Pixel Location is a value assigned to the current pixel location. Polynomial Fit(Current Pixel Location) is a value of the polynomial curve at the current pixel location. Substep 120 represents a stopping criteria check. When the stopping criteria is achieved, an acceptable minimum distance approximation is found. Thus, if the minimum distance is not found, then the method 100 returns to substep 118. However, if the minimum distance is found, then the method 100 continues to block 122. The minimum distance may be found after a certain number of iterations or when the iterative minimum distances found drop more than a predetermined percentage threshold. It is envisioned that the method 100 may proceed to substep 118 directly from block 112. After finding the minimum distance from the edge of the image to the polynomial curve, the method 100 continues to block 124.

Before executing block 124, the controller 34, at block 122, receives a calibratable sub-sampling bins. Then, the method 100 continues to block 124. At block 124, the controller 34 executes a pixel binning process using the calibratable sub-sampling bins to generate a plurality of super pixels. In the present disclosure, the term "pixel binning" means a process of combining adjacent pixels throughout an image, by summing or averaging their values, during or after readout. Then, the method 100 continues to block 126.

At block 126, the controller 34 executes a binning optimizer process 126. The binning optimizer process 126 includes substep 128 and substep 130. At substep 128, the controller 34 determines (e.g., calculates) an average luminance value for each of the plurality of super pixels (i.e., bins). Then, at substep 130, the controller 34 executes an adjusted pixel binning process using the average luminance value for each of the plurality of super pixels (i.e., bins). Thus, the binning is adjusted dynamically based on pixel's luminance value and the superimpose contrast. It is envisioned that the method 100 may execute substep 130 directly after executing block 108. Then, the method 100 continues to block 132.

At block 132, the controller 34 determines the edge spread function of the detected edge using the plurality of super pixels. Then, the method 100 continues to block 134. At block 134, the controller 34 determines a line spread function of the edge using the edge spread function. The line spread function is a first derivative of the edge spread function of the edge. Then, the method 100 continues to block 136.

At block 136, the controller 34 determines the modulation transfer function (MTF) value of the edge in the image using the linear spread function (LSF) of the edge and indirectly using the minimum distance determined at substep 120. The Fast Fourier transform of the line spread function results in the MTF value of the edge in the image.

At block 138, the controller 34 receives predetermined threshold for the MTF. Then, at block 140, the controller 34 compares the MTF value of the edge in the image with the predetermined threshold to determine whether the MTF value is greater than the predetermined threshold. If the MTF value is not greater than the predetermined threshold, then the method 100 continues to block 142. At block 142, the controller 34 commands the user interface 23 to provide an alert to the vehicle user. The alert is indicative that the camera 40 is not accurately depicting the edge. The alert may be a visual notification and/or an audible sound. If the MTF value is greater than the predetermined threshold, then the method 100 continues to block 144.

At block 144, the controller 34 stores the image and the image data on the non-transitory computer readable storage device or media 46. Then, the method 100 continues to block 146. At block 146, the controller 34 sends the image data to the perception system of the vehicle 10. At this point, the image data is processed by the perception system of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for evaluating edge quality in an image, comprising:
receiving an image from a camera of a vehicle, wherein the image includes image data;
detecting an edge in the image captured by the camera;
fitting a polynomial curve to the edge in the image captured by the camera;
executing a numerical optimizer to determine a minimum distance from each pixel in the image of the edge to the polynomial curve;
determining a modulation transfer function (MTF) value using the minimum distance;
determining whether the MTF value is greater than predetermined threshold;
providing an alert in response to determining that the MTF value is not greater than the predetermined threshold;
pixel binning a plurality of pixels of the edge in the image to generate a plurality of super pixels;
determining an average luminance value for each of the plurality of super pixels;
executing an adjusted pixel binning using the average luminance value for each of the plurality of super pixels;
storing the image data in response to determining that the MTF value is greater than predetermined threshold; and
determining an edge spread function of the edge using the plurality of super pixels.

2. The method of claim 1, further comprising determining a line spread function of the edge using the edge spread function, wherein the line spread function is a first derivative of the edge spread function.

3. The method of claim 2, wherein determining the MTF value using the minimum distance includes determining the MTF value using the line spread function, wherein the MTF is a Fast Fourier transform of the line spread function.

4. The method of claim 1, wherein detecting the edge in the image captured by the camera includes using a Canny edge detector to detect the edge in the image.

5. The method of claim 1, wherein detecting the edge in the image captured by the camera includes using a Sobel edge detector to detect the edge in the image.

6. The method of claim 1, further comprising cropping the image such that the edge is centered in the image, wherein the cropping is performed before fitting the polynomial curve to the edge of the image.

7. A tangible, non-transitory, machine-readable medium, comprising machine-readable instructions, that when executed by a processor, cause the processor to:
receive an image from a camera of a vehicle, wherein the image includes image data;
detect an edge in the image captured by the camera;
fit a polynomial curve to the edge in the image captured by the camera;
execute a numerical optimizer to determine a minimum distance from each pixel in the image of the edge to the polynomial curve;
determine a modulation transfer function (MTF) value using the minimum distance;
determine whether the MTF value is greater than predetermined threshold;
provide an alert in response to determining that the MTF value is not greater than the predetermined threshold;
pixel bin a plurality of pixels of the edge in the image to generate a plurality of super pixels;
determine an average luminance value for each of the plurality of super pixels;
execute an adjusted pixel binning using the average luminance value for each of the plurality of super pixels;
store the image data in response to determining that the MTF value is greater than predetermined threshold; and
determine an edge spread function using the plurality of super pixels.

8. The tangible, non-transitory, machine-readable medium of claim 7, further comprising machine-readable instructions, that when executed by the processor, causes the processor to:
determine a line spread function using the edge spread function, wherein the line spread function is a first derivative of the edge spread function.

9. The tangible, non-transitory, machine-readable medium of claim 8, further comprising machine-readable instructions, that when executed by the processor, causes the processor to:
determine the MTF value using the line spread function.

10. The tangible, non-transitory, machine-readable medium of claim 9, wherein the MTF is a Fast Fourier transform of the line spread function.

11. The tangible, non-transitory, machine-readable medium of claim 7, further comprising machine-readable instructions, that when executed by the processor, causes the processor to:
use a Canny edge detector to detect the edge in the image.

12. The tangible, non-transitory, machine-readable medium of claim 7, further comprising machine-readable instructions, that when executed by the processor, causes the processor to:
use a Sobel edge detector to detect the edge in the image.

13. The tangible, non-transitory, machine-readable medium of claim 7, further comprising machine-readable instructions, that when executed by the processor, causes the processor to:
crop the image such that the edge is centered in the image, wherein the cropping is performed before fitting the polynomial curve to the edge of the image.

14. A method for evaluating edge quality in an image, comprising:
receiving an image from a camera of a vehicle, wherein the image includes image data;
detecting an edge in the image captured by the camera;
fitting a polynomial curve to the edge in the image captured by the camera;
cropping the image such that the edge is centered in the image, wherein the cropping is performed before fitting the polynomial curve to the edge of the image;
executing a numerical optimizer to determine a minimum distance from each pixel in the image of the edge to the polynomial curve;
determining a modulation transfer function (MTF) value using the minimum distance;
determining whether the MTF value is greater than predetermined threshold;
providing an alert in response to determining that the MTF value is not greater than the predetermined threshold;
pixel binning a plurality of pixels of the edge in the image to generate a plurality of super pixels;
determining an average luminance value for each of the plurality of super pixels;
executing an adjusted pixel binning using the average luminance value for each of the plurality of super pixels;
storing the image data in response to determining that the MTF value is greater than predetermined threshold;
determining an edge spread function of the edge using the plurality of super pixels; and
determining a line spread function of the edge using the edge spread function, wherein the line spread function is a first derivative of the edge spread function.

15. The method of claim 14, wherein determining the MTF value using the minimum distance includes determining the MTF value using the line spread function, wherein the MTF is a Fast Fourier transform of the line spread function.

16. The method of claim 14, wherein detecting the edge in the image captured by the camera includes using a Canny edge detector to detect the edge in the image.

17. The method of claim 14, wherein detecting the edge in the image captured by the camera includes using a Sobel edge detector to detect the edge in the image.

* * * * *